United States Patent [19]
Firoozmand et al.

[11] Patent Number: 5,119,374
[45] Date of Patent: Jun. 2, 1992

[54] METHOD OF AND SYSTEM FOR IMPLEMENTING MULTIPLE LEVELS OF ASYNCHRONOUS PRIORITY IN FDDI NETWORKS

[75] Inventors: Farzin Firoozmand, Cupertino; Gururaj Singh, San Jose, both of Calif.

[73] Assignee: Advanced Micro Devices, Inc., Sunnyvale, Calif.

[21] Appl. No.: 769,755

[22] Filed: Oct. 3, 1991

Related U.S. Application Data

[63] Continuation of Ser. No. 529,365, May 29, 1990, abandoned.

[51] Int. Cl.⁵ ............................. H04J 3/22; H04J 3/02
[52] U.S. Cl. .................................. 370/85.4; 370/85.6; 370/85.15; 340/825.51

[56] References Cited

U.S. PATENT DOCUMENTS

| | | | |
|---|---|---|---|
| 4,404,557 | 9/1983 | Grow | 370/85.6 |
| 4,459,588 | 7/1984 | Grow | 370/85.6 |
| 4,667,323 | 5/1987 | Engdahl et al. | 370/85.6 |
| 4,677,612 | 6/1987 | Olson et al. | 370/85.2 |
| 4,930,121 | 5/1990 | Shiobara | 370/85.6 |

Primary Examiner—Douglas W. Olms
Assistant Examiner—H. Kizou
Attorney, Agent, or Firm—Lowe, Price, LeBlanc & Becker

[57] ABSTRACT

The standard FDDI priority algorithm is implemented by programming Token Holding Time (THT) threshold values for asynchronous service either in an increasing or decreasing order as a function of token holding time. If the thresholds are programmed in a decreasing order, all higher priority data is sent to the network before any lower priority data is sent. If the thresholds are programmed in an increasing order, highest priority data is sent first, until the unexpired token holding time falls below the threshold value for that priority; the next lower priority level data then is transmitted, and so on. Accordingly, at least some data of all priority assignments pending for transmission are sent to the medium during each token capture.

13 Claims, 11 Drawing Sheets

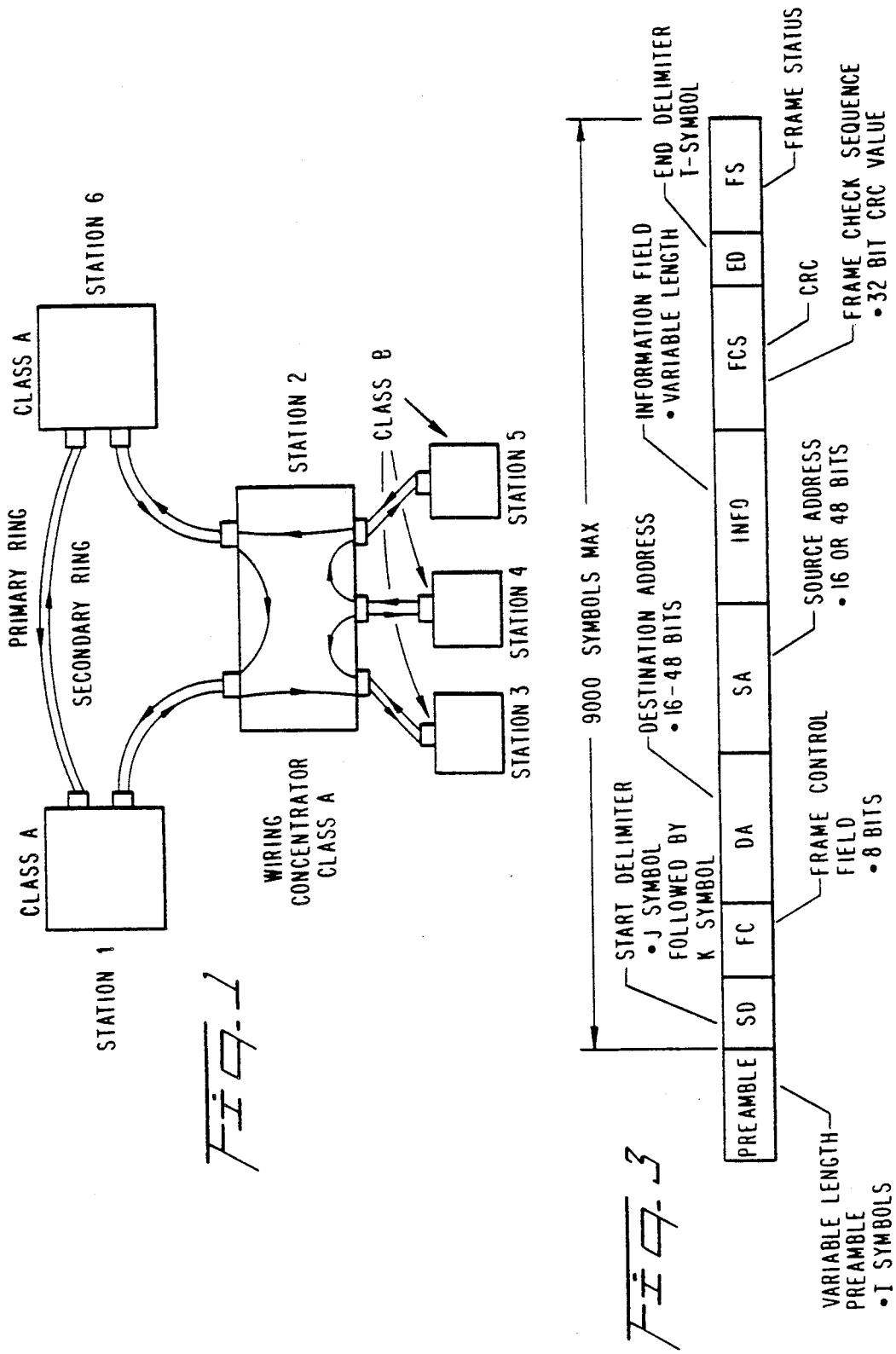

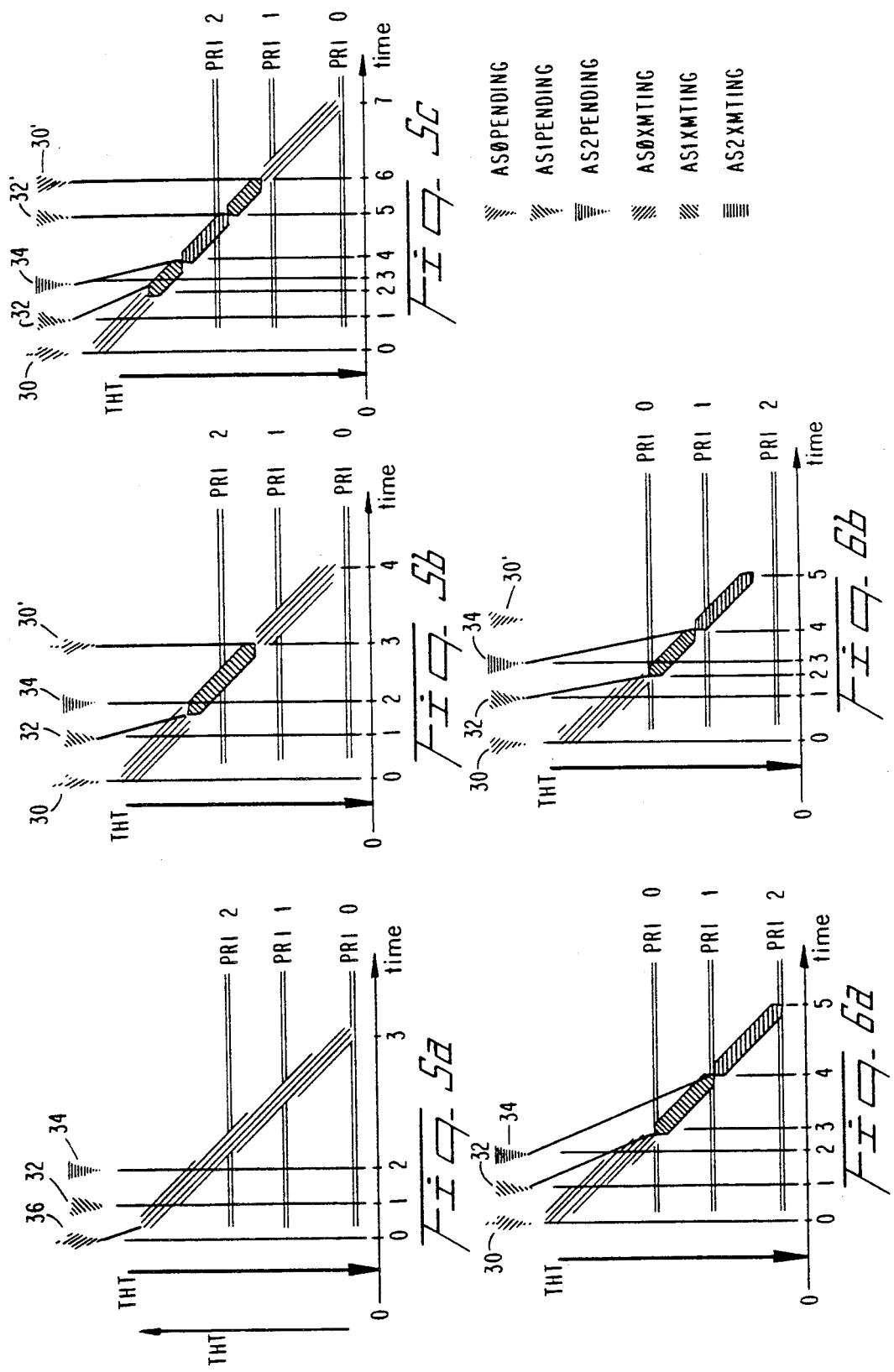

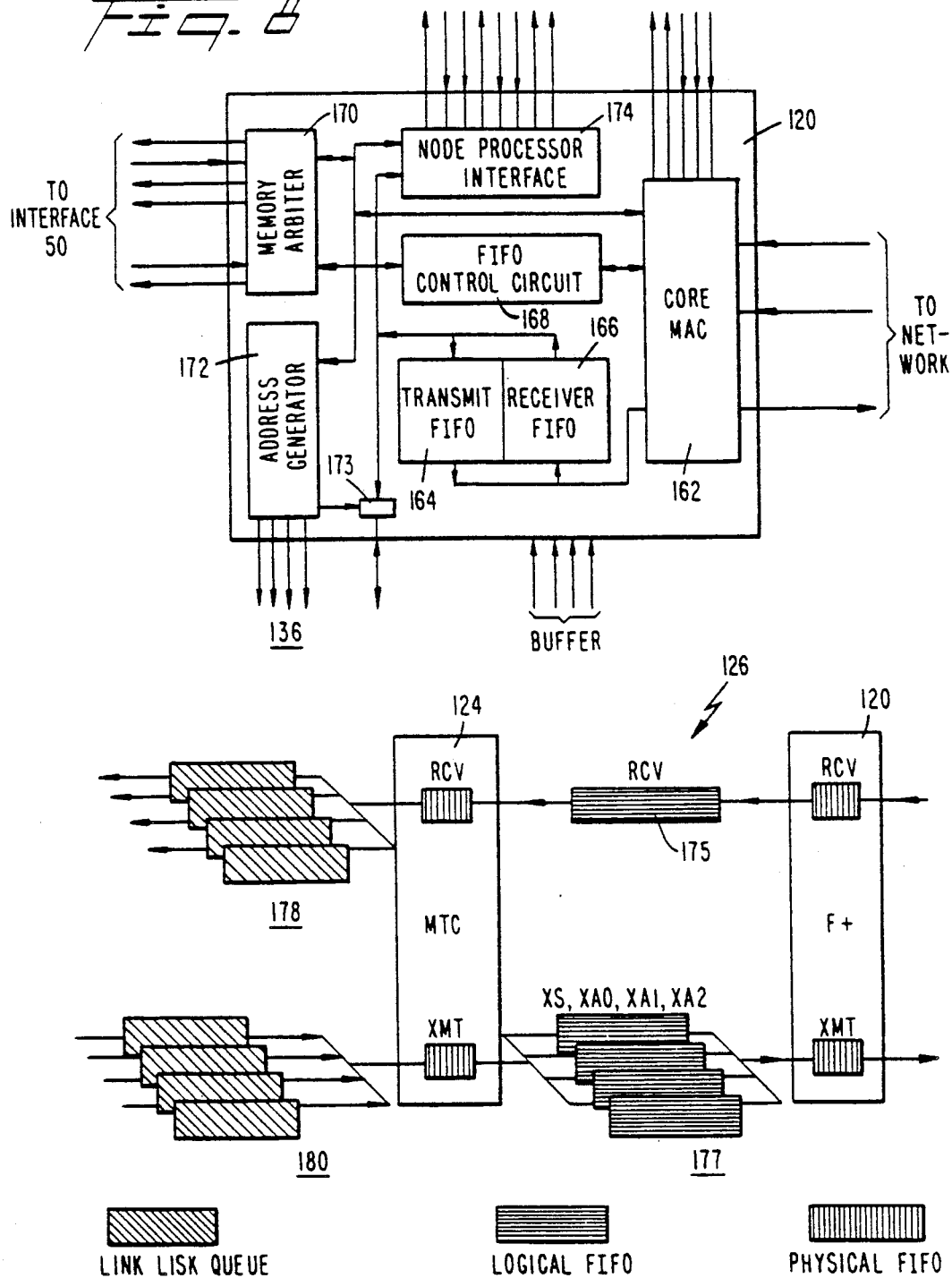

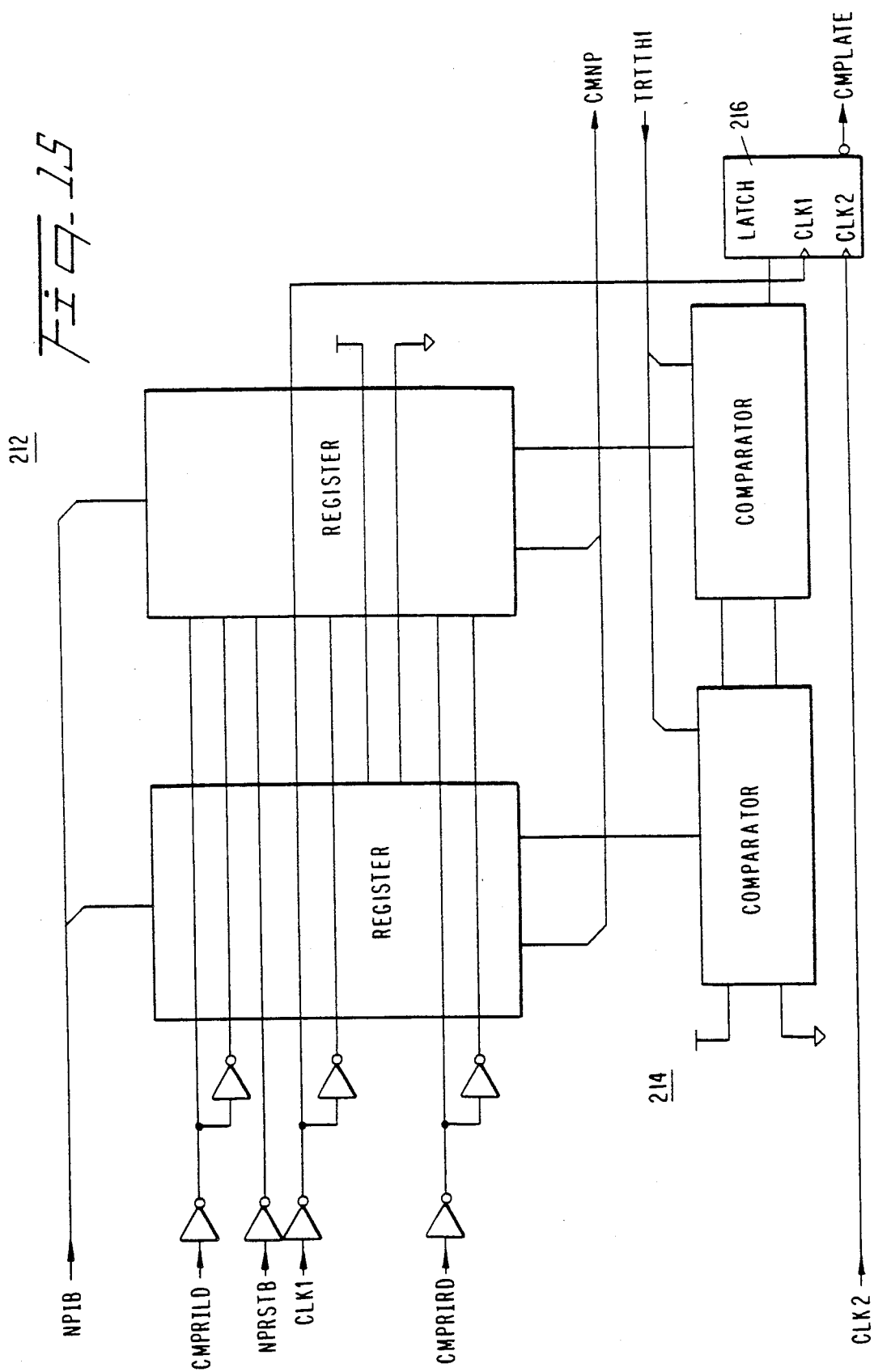

METHOD OF AND SYSTEM FOR IMPLEMENTING MULTIPLE LEVELS OF ASYNCHRONOUS PRIORITY IN FDDI NETWORKS

CROSS-REFERENCE TO RELATED APPLICATIONS

This application is a continuatin of application Ser. No. 07/529,365 filed May 29, 1990, now abandoned.

This application is related to the following copending applications, owned by the Assignee of this invention, and filed on even date herewith:

1) Firoozmand, Ser. No. 07/529,364, for "FDDI CONTROLLER HAVING FLEXIBLE BUFFER MANAGEMENT", 2) Firoozmand, Ser. No. 07/529,362, for "MEMORY MANAGEMENT SYSTEM AND METHOD".

3) Firoozmand et al., Ser. No. 07/529,366, for "METHOD OF AND SYSTEM FOR TRANSFERRING MULTIPLE PRIORITY QUEUES INTO MULTIPLE LOGICAL FIFOS USING A SINGLE PHISICAL FIFO".

4) Firoozmand, Ser. No. 07/529,363, for "CONFIGURATION OF SRAMS AS LOGICAL FIFOS FOR TRANSMISSION AND RECEPTION OF PACKET DATA".

TECHNICAL FIELD

This invention relates generally to Fiber Distributed Data Interface (FDDI) networks, and more particularly, to a method of and system for transmitting on an FDDI network queues of packet data having different levels of priority.

BACKGROUND ART

A new standard of local area networking, known as the "Fiber Distributed Data Interface" (FDDI), based on fiber optic components and systems, and developed by the American National Standards Institute (ANSI) X3T9.5 Committee, defines a 100 megabit per second, timed-token protocol implementing dual counter-rotating physical rings. FIG. 1 is a simplified block diagram of an FDDI ring composed of a variety of station types. Class A stations, sometimes referred to as "dual attachment stations", are connected both to the primary and secondary rings of the network. Data flows in opposite directions on the two rings, as indicated by the arrows. The Class A stations can act as a wiring concentrator, serving to connect several single-attachment, or Class B, stations to the ring. In FIG. 1, station 2 is a wiring concentrator for stations 3, 4 and 5; concentrators provide the network administrator with a single maintenance point for a large number of stations. Data transferred between stations is in the form of framed packets.

The format of an FDDI packet is shown in FIG. 3. Packets are preceded by a minimum of 16 idle control symbols (preamble). Packets begin with a start delimiter (SD) composed from the J and K control symbols of the 4B/5B code, well known in the art. This is followed by a two-data-symbol frame control (FC) field that identifies the type of packet. The destination address (DA) identifies the intended recipient of the packet. Likewise, the source address (SA) identifies the sender of the packet. Addresses can be either 26 or 48 bits in length. The DA field can point to a single station, a group of stations, or all stations on the ring.

Following SA comes the variable length information field. A frame check sequence (FCS) field contains 4 bytes of data. These data are the result of a 32 bit Autodin 11 cyclic redundancy check polynomial. The FCS insures data integrity of the FC, DA, SA, INFO and PCS fields.

Following the FCS field, an end delimiter (ED) formed with the T symbol is transmitted. The frame status (FS) field is used for symbols that determine whether the packet was received with error, if the address was recognized, or whether the packet was copied.

Packets are removed from the FDDI by the originating station. In this process, called "stripping" and shown in FIGS. 2(a) and 2(b), a medium access controller (MAC) 20 selects a source of IDLE control symbols for transmission on the ring. When a start delimiter arrives, the controller switches to a repeat path. The packet is monitored, copied if required, and simultaneously repeated. The medium access controller 20 also can switch to source its own packets or issue a token.

In token-passing, stations distribute the right to transmit on the medium by circulating a "token", which is a special bit pattern that assigns the right to transmit to the station that receives it. A station that wishes to transmit waits until it receives the token from the previous station in the token-passing order. When the station receives the token, it transmits its data, then passes the token to the next station.

An FDDI station waiting to transmit must first "capture" the token by performing the stripping action. Only the token SD field is repeated on the ring. Once the token is captured, the station can begin transmitting packets. When the last packet is sent, the station immediately follows by issuing a new token.

The rules for capturing the token and the amount of time allotted for data transmission are governed by "timed token protocol" defined in FDDI specifications The protocol is designed to guarantee a maximum token rotation time (TRT), decided in a bidding process among stations during a claim process on initialization. The bidding process allows the station requiring the fastest time between token arrivals to dictate a target token rotation time (TTRT) for the ring.

Timed token protocol offers two types of transmission service, namely, synchronous service and asynchronous service. Stations are given a predetermined amount of transmission bandwidth on each token rotation with synchronous service; the remaining ring bandwidth is shared among stations using asynchronous service. Stations are allowed to send asynchronous transmission when the token service arrives earlier than expected. The amount of time allotted for asynchronous transmission is limited to the difference between the actual time of arrival by the token and the expected token arrival time. The allotment of bandwidth for asynchronous transmission is dynamic, with any unused bandwidth for synchronous transmission being automatically reallocated for asynchronous transmission on a token rotation.

To control access to the network, FDDI uses the TTRT negotiated in the claim process in conjunction with two internal timers, termed a token-rotation timer (TRT) and a token-holding timer (THT). The TRT measures the time between the receipt of tokens on the network, and expires when it reaches a value that exceeds the target token rotation time. The second timer, the THT, measures the time that the station holds the token while sending asynchronous packets.

The rules for data transmission in FDDI depend on the type of data to be sent. The amount of synchronous data that can be transmitted on a given token opportunity is limited by the bandwidth-allocation process which insures that if every station transmits the maximum allotment of synchronous data, the negotiated TTRT will not be exceeded. In asynchronous transmission, a station can transmit asynchronous data until the unused bandwidth on the ring is exhausted. The two timers are used to determine the amount of unused bandwidth on a given token rotation.

The mechanics of controlling the asynchronous transmission lies in the operation of the timers within each FDDI station. When a token arrives, the TRT is set equal to the TTRT. The TRT immediately begins to count down, and expires when a zero value is reached. When this occurs, the TRT is reloaded with the target time. If the token arrives early, the value remaining on the TRT is loaded into the THT. Again, the TRT is reloaded with the target token rotation time. The THT will count down only during asynchronous data transmission, and when it expires, i.e., reaches zero, the station must wait for the next early token arrival to send asynchronous data.

FIG. 4 shows an example of this operation by displaying the values of the TRT and THT for a particular station on an FDDI ring. Assume that the negotiated target rotation time is 100 milliseconds and that the synchronous bandwidth alloted to the station is limited to 30 milliseconds. Significant events are labelled on the abscissa with letters.

Event A marks the arrival of a token. Assume for the present example that no data is available to transmit upon this arrival. The TRT is set to the 100 millisecond target value.

At Event B, the token arrives back to the station in 60 milliseconds, 40 milliseconds earlier than the target time. This 40 millisecond time is "remembered" by loading the TRT remainder into the THT (see dotted line). The THT is set and the station begins to send its 30 millisecond allotment of synchronous data.

The station sends its entire synchronous bandwidth allotment from B to C. At C, asynchronous transmission begins, and the THT begins counting down. The THT expires at D, so that no more asynchronous transmission can occur. Since the station has already used its alloted synchronous bandwidth, a token must be issued.

Event E marks the expiration of the TRT, and at F, the token arrives. Not shown is a third counter, termed a late counter (LC), which stores the time elapsed from E to F. This interval of time is indicative of how much later than the TTRT the token arrived. The lateness of token arrivals is accumulated during rotations of the token as a means to guarantee an upper bound of twice the negotiated target time, in accordance with FDDI specifications.

The timed-token protocol is further refined in FDDI to include the concept of priority. Asynchronous frames can be categorized into eight priority levels; each priority has an associated time threshold value that is compared to the time remaining on the THT. If the priority time is less than the time remaining on the THT, pending frames with that priority assignment can be transmitted. The pending frames will continue to be transmitted until they are exhausted or the unexpired token holding time falls below the THT threshold value for that priority. Frames of the next lower priority assignment will then be transmitted until exhausted or until the value of time designated by the THT falls below the threshold value for that lower priority, and so on.

DISCLOSURE OF THE INVENTION

Accordingly, one object of the invention is to improve transmission of asynchronous data in an FDDI network.

Another object is to improve asynchronous transmission to an FDDI medium by transmitting to the medium the highest priority data first, and if any time remains in the THT, then transmit lower priority data.

Another object is to implement an improved FDDI transmission algorithm so that during each token capture, at least some pending data of each priority assignment is transmitted to the medium.

These and other objects are satisfied in accordance with the invention by setting the values of THT threshold values in an arbitrary order of priority as a function of token holding time. A preferred embodiment of the invention provides, in an FDDI network, method and apparatus for setting the values of token holding time threshold values arbitrarily in an increasing or decreasing order of priority as a function of unexpired THT. By setting the values of token holding time threshold values to increase in an increasing order of priority as a function of unexpired token holding time, that is, with the highest priority data (AS0) assigned the highest corresponding priority threshold value (PRI0) as a function of unexpired token holding time, etc., at least some data of each priority assignment is transmitted to the medium during every token capture.

In accordance with another aspect of the invention, THT threshold values programmed by a node processor are stored in registers. The stored THT threshold values are compared with the THT to determine when a transmission of each priority is to be made to the medium. Upon receipt of the token, a medium access controller determines which frame waiting to be transmitted has the highest priority, and transmits that frame to the medium if the initial THT is greater than the threshold value for that priority. Thereafter, and following transmission of each frame, the medium access controller determines which frames now are pending and identifies the priority of each. A frame having the highest priority is transmitted to the medium if the unexpired token holding time is greater than the threshold value for that priority. If the unexpired token holding time is not greater than the threshold value for that priority, the network access controller transmits a frame of the next lower priority pending if the unexpired token holding time is greater than the threshold value of the next lower priority, and so on. Upon expiration of the token holding time, the token is issued, and no further transmission takes place until the next token opportunity. However, because the threshold levels are arranged in the order described, i.e., by setting the values of THT threshold values to increase in an increasing order of priority as a function of unexpired token holding time, at least some data of all priorities pending are sent to the medium upon every token capture.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 1 is a simplified block diagram of an FDDI ring composed of a variety of station types.

FIG. 3 is a diagram showing the format of an FDDI packet.

FIGS. 5(a)-5(c) show examples of sequences of transmissions of frames of asynchronous data with THT threshold levels programmed in a decreasing order of priority as a function of unexpired THT.

FIGS. 6(a) and 6(b) are examples of sequences of transmission of frames of asynchronous data with THT threshold levels programmed in an increasing order of priority as a function of unexpired THT, in accordance with this invention.

FIG. 8 is a more detailed diagram of the medium access controller shown in the block diagram FIG. 7.

FIG. 9 is a diagram showing data flow carried out in the medium access controller of FIG. 7.

FIGS. 13-15 are circuit diagrams showing portions of the medium access controller of FIG. 11.

DETAILED DESCRIPTION OF THE INVENTION

OVERVIEW

The first method of transmission sequences of asynchronous frames of data in accordance with the invention can be implemented as shown in FIGS. 5(a)-5(c). In these examples, three levels of asynchronous priorities are presumed. The highest priority is signified by AS0, and the remaining two, in descending order of priority, are designated as AS1 and AS2. Data assigned with these three priorities are stored separately in three queues; synchronous data is stored in a fourth queue, as described in copending application (3), supra, for "Transfer of Multiple Priority Inquiries Into Multiple Logical FIFOs Using a Single Physical FIFO". See also copending application (1), supra, for "FDDI Controller Having Flexible Buffer Management", for description of an FDDI network interface within which the present invention may be implemented. The disclosures of both copending applications are incorporated herein by reference.

In accordance with FDDI specifications, there are up to eight THT threshold values for priorities which determine which queues are transmitted to the medium while the station is holding a token. Three threshold values designated as PRI0, PRI1 and PRI2 in FIGS. 5(a)-5(c), are arranged in a decreasing order of priority as a function of increasing unexpired token holding time, i.e., the lowest priority assignment AS2 has the highest corresponding THT threshold value PRI2, and the highest priority assignment AS0 has the lowest corresponding THT threshold level PRI0, as a function of unexpired token holding time.

In general, upon token capture at $t=0$, a station first will transmit synchronous data to the medium, if any synchronous data is pending. Transmission of asynchronous frames, in accordance with FDDI specifications, provides sending to the medium the highest priority currently pending while the unexpired token holding time is above the THT threshold value for that priority. This algorithm is implemented on a frame-by-frame basis.

Figures 2A, 2B:
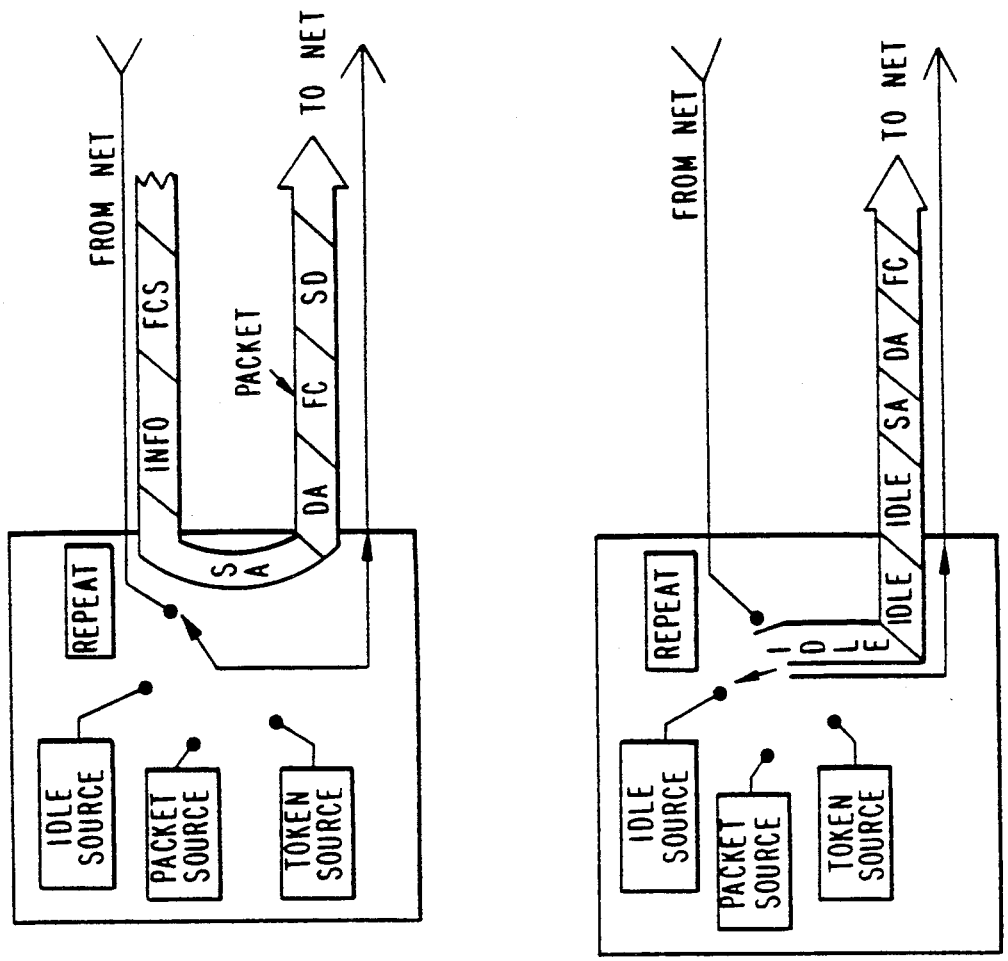
FIGS. 2(a) and 2(b) are diagrams showing operation of an FDDI network controller repeating and stripping, respectively, a packet from the ring.
Figure 4:
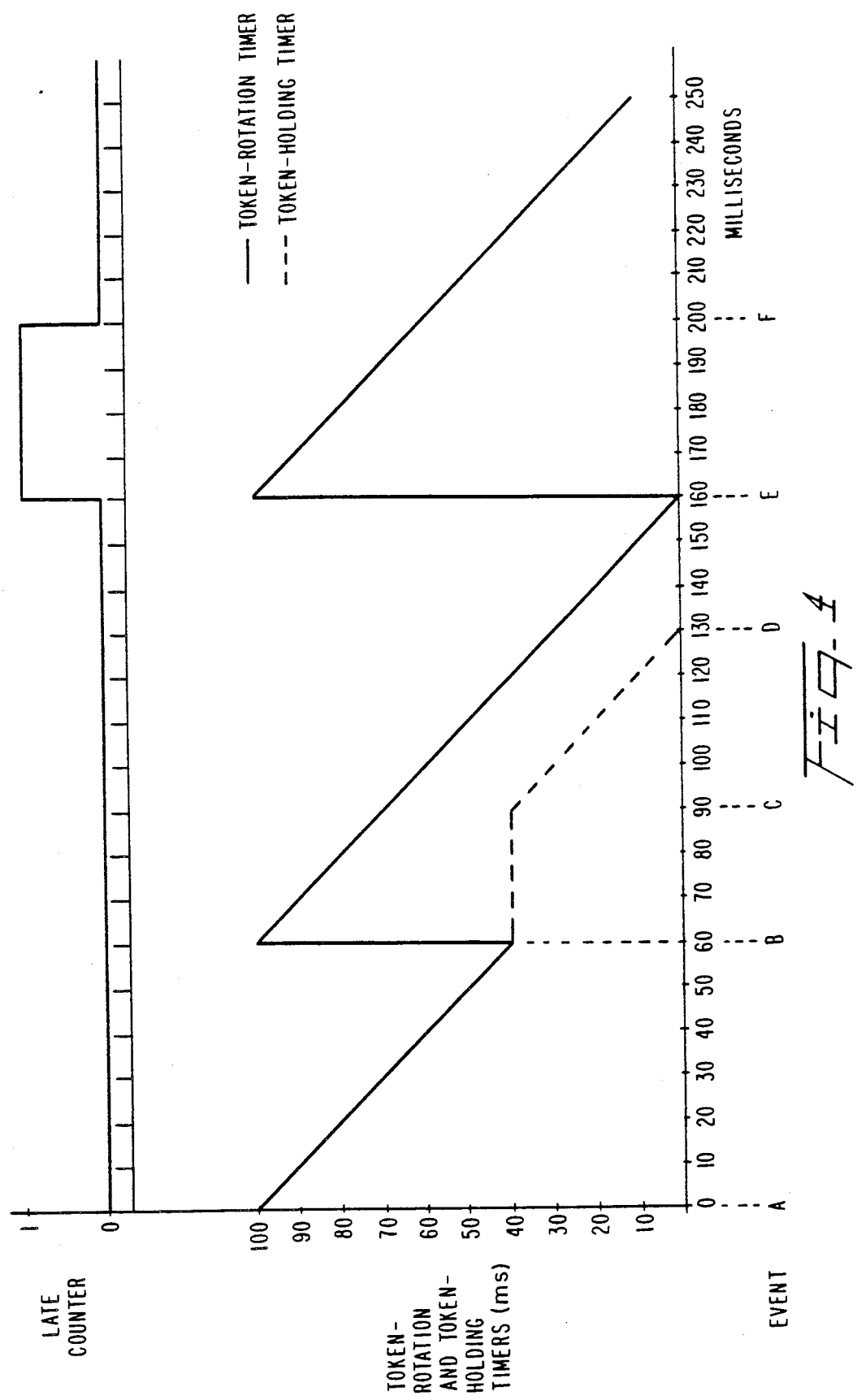
FIG. 4 is a diagram showing operation of the token holding and token rotation timers during token capture.
Figure 7:
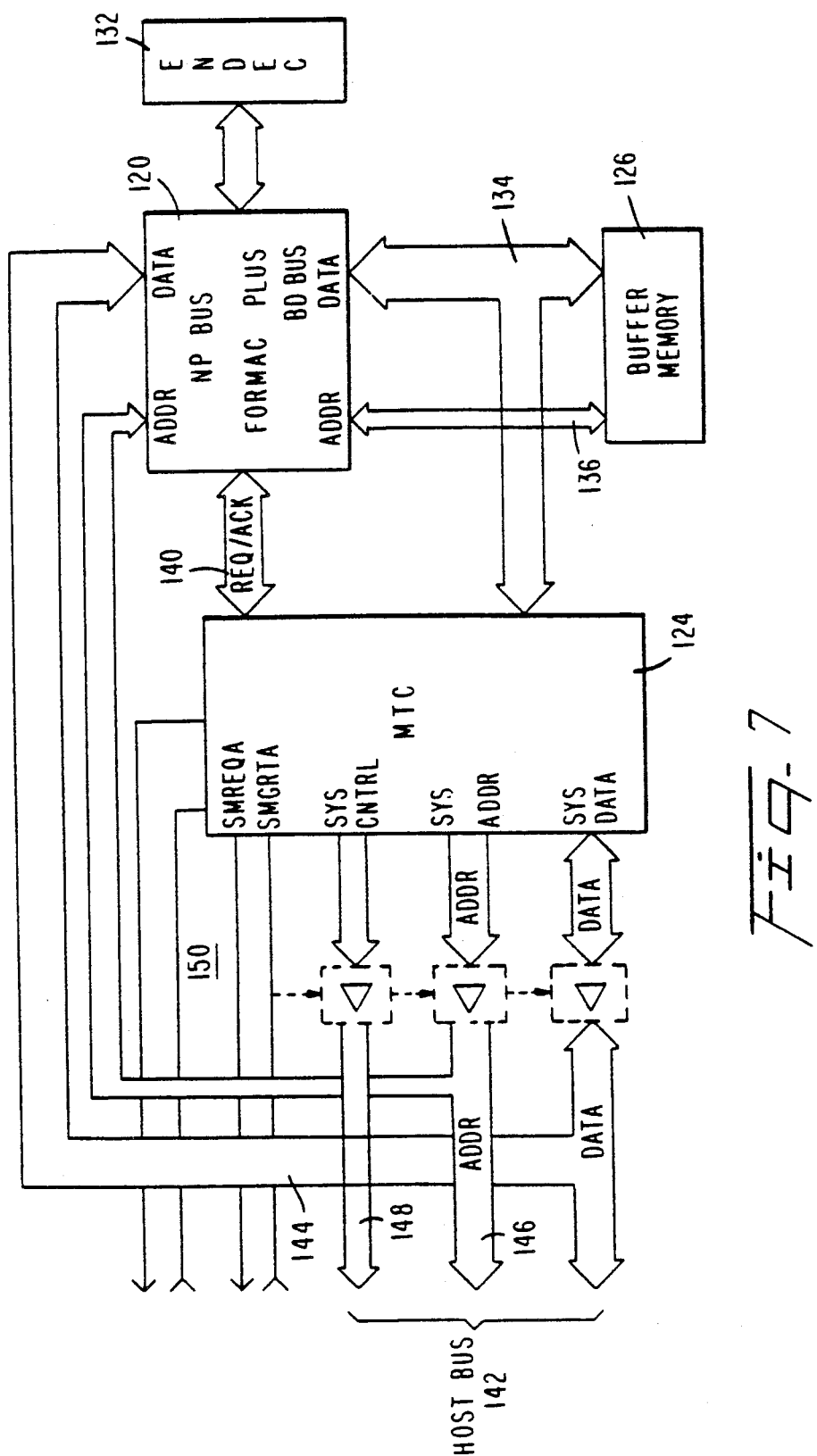
FIG. 7 is a block diagram of a medium access controller 120 in an FDDI mode within which the FDDI priority algorithm of the invention may be implemented.

Assuming during token capture that time remains for transmitting asynchronous data because the token has arrived early, the medium access controller 120 shown in FIG. 7 collects queued frames of data to be serviced in descending order of priority, namely, first AS0, next AS1 and then AS2. During asynchronous data transmission the token holding timer (THT) counts down from the initial token holding time as shown by the downward arrow in FIG. 5(a). Any queue of framed data can be transmitted to the medium only when the unexpired token holding time is greater than the THT threshold level for that priority. In the example of FIG. 5(a), upon token capture, pending frames at 30 having highest priority AS0 begin to be transmitted to the medium. The token holding timer (THT) counts down and transmission continues as long as the unexpired token holding time is greater (i.e., elapsed token holding time is less) than the corresponding THT threshold value PRI0. Frames 32 and 34 of data having priorities AS1 and AS2 also become pending at $t_1$ and $t_2$. However, frames of neither priority AS1 or AS2 are sent to the medium because at least one frame having the higher priority AS0 remains pending. This condition continues until the token holding timer has expired at $THT=0$ and $t=t_3$, in FIG. 5(a), and the token is issued.

In FIG. 5(b), frames of data at 30 having priority assignment AS0 (highest priority), pending upon token capture at $t=0$, are transmitted to the medium. At time $t_1$, frames of data at 32 having priority AS1 (intermediate priority) become pending but are not transmitted to the medium because AS0 is not yet exhausted and the unexpired THT is greater than threshold level PRI0 for priority AS0. At time $t_2$, data having priority AS0 is exhausted. Since frames of data having priority AS1 (intermediate priority) remain pending, and the unexpired THT is greater than the threshold value PRI1 corresponding to that priority, frames of priority AS1 are transmitted to the medium. Although frames of data having lowest priority AS2 are pending at 34, AS2 is not transmitted since its priority is lower than that of AS1.

Assume that asynchronous data 30' having the highest priority AS0 again becomes pending at $t_3$ as shown. Since the unexpired THT is above THT threshold value PRI0, frames of priority AS0 are transmitted to the medium until frames of priority assignment AS0 become exhausted at $t_4$. Thereafter, the token is issued.

Data having priority AS2 was not transmitted to the medium during the duration of this token capture.

In FIG. 5(c), upon token capture at t=0, frames of data having priority AS0, initially pending at 30, are transmitted to the medium but become exhausted at time $t_2$. However, at time $t_1$ data having priority AS1 has become pending, but is not sent to the medium until frames of priority AS0 are exhausted at $t_2$. Frames having priority AS2 become pending at 34 (t = $t_3$), but are not transmitted to the medium until AS1 is exhausted at $t_4$. All this time, the unexpired THT is greater than THT threshold values PR2, PR1, PR0.

At time t=$t_4$, data having priority assignment AS2, now pending at 34, is transmitted to the medium since the unexpired THT is greater than threshold value PRI2. However, at t=$t_5$, the THT crosses threshold PRI2, so that transmission of AS2 is terminated following completion of a frame.

Frames having the intermediate priority assignment AS1 at 32' become pending at t=$t_5$. Since the unexpired THT is greater than THT threshold PR1 for AS1, frames having priority assignment AS1 are transmitted to the medium. However, frames of data having priority assignment AS0, which have become pending at t=$t_6$, are transmitted to the medium until the THT crosses the THT threshold value PRI0 at t=$t_7$. Thereafter, the token is issued, and no further asynchronous transmission can take place until token is captured again.

It is apparent that under certain circumstances data having a particular priority assignment will not be transmitted to the medium during token capture. Although transmission of frames of all three priority assignments are sent to the medium during token capture in the example of FIG. 5(c), in the example of FIG. 5(a), data having only the highest priority assignment AS0 is sent to the medium even though data of all three priorities are pending during the token capture. This is because this transmission algorithm provides transmission only of pending data having the highest priority assignment while the unexpired token holding time is above the THT threshold value for that priority. In FIG. 5(a), because data having the highest priority assignment AS0 has not been exhausted during token capture, AS0 is transmitted exclusively until time t=$t_3$ when the unexpired token holding time falls below the THT threshold value PRI0. Similarly, in FIG. 5(b), data having the lowest priority AS2, pending during token capture at 34, is never transmitted because AS2 data always must wait for pending data of a higher priority.

On the other hand, it would be desirable in many network applications to provide transmission of at least some frames of data of each priority assignment during every token capture.

The second method of transmission of sequences of asynchronous frames of data, implemented in accordance with the invention, is shown in FIGS. 6(a) and 6(b). As in FIGS. 5(a)-5(c) of the first method of the invention, the examples of FIGS. 6(a) and 6(b) in accordance with the invention consider three levels of asynchronous priorities. In the present invention, THT threshold values as a function of unexpired token holding time are programmable arbitrarily in an increasing or decreasing order of priority. Accordingly, and in the preferred embodiment, THT threshold values are programmed so that frames having higher priority assignment have higher corresponding threshold values as a function of unexpired token holding time. Thus, the priority threshold for frames having the highest priority AS0 has the highest threshold value PRI0 as a function of unexpired THT. The threshold for frames having an intermediate priority assignment AS1 has a value PRI1 as a function of unexpired THT that is lower than PRI0. Similarly, the threshold for frames having the lowest priority AS2 has the lowest value PRI2. Transmission of sequences of frames to the medium is based on the same algorithm as the first method; however, because the THT threshold values of the three priorities are programmed arbitrarily, in the preferred embodiment, and, in descending order, it is possible to ensure that data frames of all priority assignments are sent to the medium during every token capture.

In the example of FIG. 6(a), assume that frames 30 having a priority assignment AS0 are pending initially, at t=0, that frames 32 having priority assignment AS1 are pending at t=1 and that frames having priority assignment AS2 are pending at t=2 as shown. Frames having priority assignment AS0 initially are transmitted to the medium because at time t=0, highest priority data AS0 pending, and the unexpired token holding time (THT) is greater than the corresponding threshold value PRI0. Pending frames having priority assignment AS1 at t=$t_1$ are not transmitted because there are also frames pending having the higher priority assignment AS0.

However, at time t=$t_3$, the unexpired token holding time has fallen below that of threshold value PRI0 so that no further frames having priority assignment AS0 can be transmitted to the medium. This is true even though AS0 represents frames having the highest priority. Since the highest priority now pending is AS1, frames having priority assignment AS1 are transmitted to the medium. Frames having priority AS2, which became pending at time t=$t_2$, are not transmitted because they have a lower priority than other pending frames of priority assignment AS1.

At time t=$t_4$, the unexpired token holding time has fallen below threshold value PR1, so that no additional frames having a priority assignment AS1 can be transmitted to the medium. However, frames having priority AS2, which became pending at time t=$t_2$, are now transmitted to the medium until the unexpired token holding time falls below threshold value PRI2. At that time, the token is issued.

A comparison of FIGS. 6(a) with 5(a) shows that based on the same data pending, data frames of all three priority assignments are transmitted to the medium during token capture, in the second method of the invention whereas only frames having highest priority assignment AS0 are transmitted to the medium in accordance with the first method of the invention.

In the example of FIG. 6(b), frames having priority assignment AS0 are transmitted to the medium initially upon token capture, at t=0. Frames of data having priority assignment AS1 become pending at t=$t_1$ but are not sent to the medium since frames having a higher priority AS0 remain pending and the unexpired token holding time has not fallen below the corresponding priority value PRI0. However, at time t =$t_2$, as the unexpired THT crosses threshold value PRI0, frames having priority assignment AS1 are transmitted to the medium.

At time t=$t_3$, frames having priority assignment AS2 become available, but are not transmitted because frames of higher priority AS1 remain pending and the unexpired THT has not attained a value less than that of the corresponding priority value PR1. However, at time t=t₄, as the unexpired token holding time crosses the threshold value PRI1, frames of data having a priority assignment AS2 are sent to the medium, and this continues until frames having priority assignment AS2 are exhausted at t=t₅. At that time, the token is issued.

Thus, in FIG. 6(b), data of all three priorities AS0, AS1 and AS2 are transmitted during token capture, whereas in FIG. 5(b) of the first method, only frames having priority assignments AS0 and AS1 are sent to the medium; no frames having priority AS2 are sent to the medium during token capture.

With reference to FIG. 7, in an FDDI interface of a type described in more detail in copending application (2), supra, for "Memory Management System and Method", a bus master architecture, shown generally as 116, is provided between a system, or user, bus and a network in the form of a fiber optic medium. The principal components of the bus master architecture 116 comprise a medium access controller (MAC) 120 for accessing the medium through an encoder/decoder (ENDEC) 132 that receives data frames from controller 120 and performs appropriate encoding of the frames before converting the data from parallel to serial format and carrying out other "housekeeping" functions to satisfy FDDI requirements. A network DMA (direct memory access) controller 124 controls transfer of data between at least one system memory (not shown) on the system bus and a buffer 126, configured to have at least one FIFO (first in-first out) memory, connected between the network DMA controller and the medium access controller. The network access controller 120 implements proper network access protocol, receiving and transmitting frames of data while carrying out any required housekeeping functions such as frame stripping, error checking and bus arbitration. The network DMA controller 124 operates as a front end bus master, communicating with the host or node processor together to scatter and gather data from and among system memories and the buffer while minimizing movement of data in the memory.

The medium access controller 120 is interfaced to buffer memory 126 through a data bus 134 and an address bus 136, and to the network DMA controller 124 through data bus 134. Handshaking is carried out between the controllers 124 and 120 on a bus 140 to control movement of data to and from the medium.

The network DMA controller 124 resides on a host bus 142 comprising a shared data bus 144 and address and control busses 146, 148. Arbitration signals to the network DMA controller 124 are interfaced to the host on bus request and acknowledgement lines 150. Medium access and network DMA controllers 120 and 124, together with buffer memory 126, cooperate to carry out network interface operations on the various busses shown, as described in detail in copending application (1), supra, incorporated herein by reference.

The medium access controller 120, shown in more detail in FIG. 8, comprises a core medium access controller (MAC) 162 for handing FDDI MAC protocol. The data I/O port of MAC 162 is connected to transmit and receive FIFOs 164 and 166. Data received from the medium is supplied by the receive FIFO 166 to the external buffer memory 126; data from the external buffer to be supplied to the medium is stored in transmit FIFO 164. A FIFO control circuit 168 coordinates loading and unloading of the transmit and receive FIFOs 164 and 166 based on memory arbitration decisions made by a memory arbiter 170.

An address generator 172 supplies required external buffer memory addresses on address bus 136 based on the access decision of the arbiter which determines whether the medium or the node processor can access the buffer memory 126. A node processor interface 174, whose data input is controlled by address generator 172 via gate 173, decodes instructions from the node processor, collects chip status and distributes control information throughout the controller 124.

The transmit and receive FIFOs 164 and 166, on-chip with the medium access controller 120, store a number of data packets depending primarily on the latency of the system bus and burst length.

Referring to FIG. 9, the external buffer memory 126, shown in FIG. 7, is configured to have a receive FIFO 175 containing a queue of data received from the medium and at least one, but preferably four, transmit FIFOs 177 each containing a queue of data to be supplied to the medium. Four queues are shown in FIG. 9 to represent one synchronous queue and asynchronous queues containing data having three different assigned levels of priorities in accordance with FDDI specifications. The buffer memory 126, which preferably is a static random access memory (SRAM), is programmed by firmware to have four FIFOs each containing a data queue of a different priority; specifically each FIFO is defined using pointers in a conventional manner.

Data received from the medium is supplied by the network DMA controller 124 to the system memory through link list queues 178, and similarly, data is transmitted to the medium from the system memory through link list queues 180 that correspond to the synchronous and three levels of asynchronous priorities. Reference is made herein to copending application (2), supra, for "Memory Management System and Method" for details on buffer memory management implemented in this system.

Figure 10:
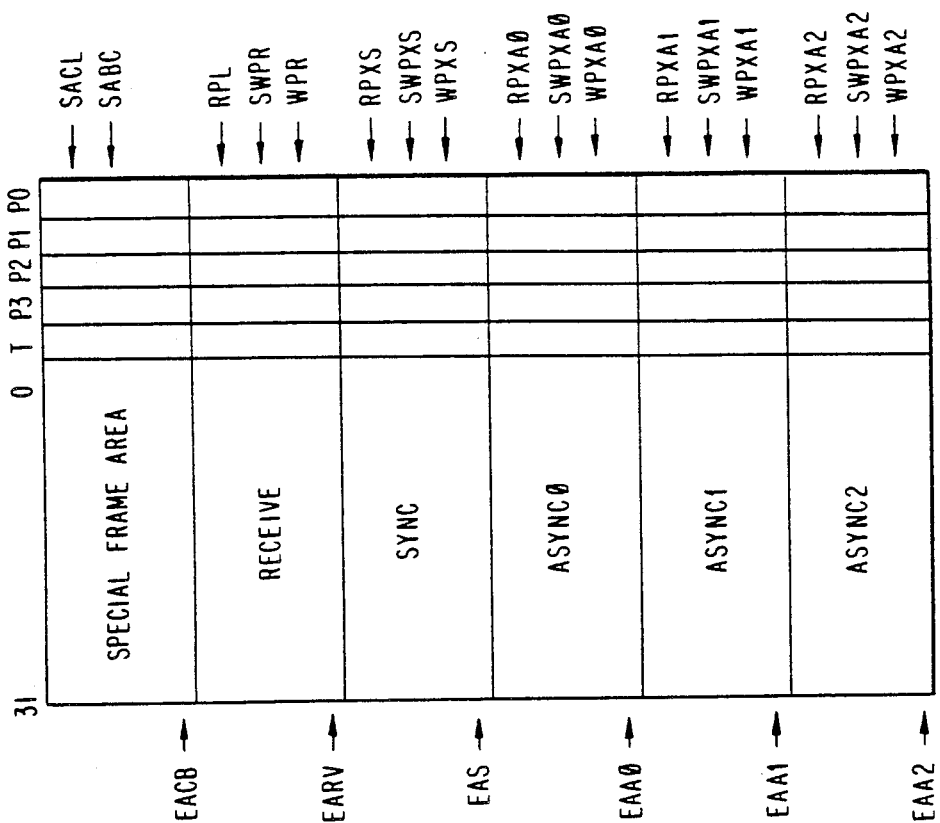
FIG. 10 is a diagram showing organization of the buffer memory of FIG. 7 in synchronous and asynchronous data queues.

Prior to any operation involving the buffer memory 126, the node processor must load into the buffer the end addresses of all the queues. Queue pointers are in the order shown in FIG. 10, i.e., pointers define first the end of a special frame area, then a receive queue and next transmit queues in the order of sync queue followed by three levels of priority of asynchronous queues. Also programmed by the node processor are the read/write pointers of all queues being used, as shown in the right hand column of FIG. 10; end address pointers are shown in the left hand column of the figure.

The formats of the transmit and receive frames, as well as details on transmit and receive operations carried out by the FDDI interface 116, are described in copending application (1), supra, incorporated herein by reference.

Figure 11:
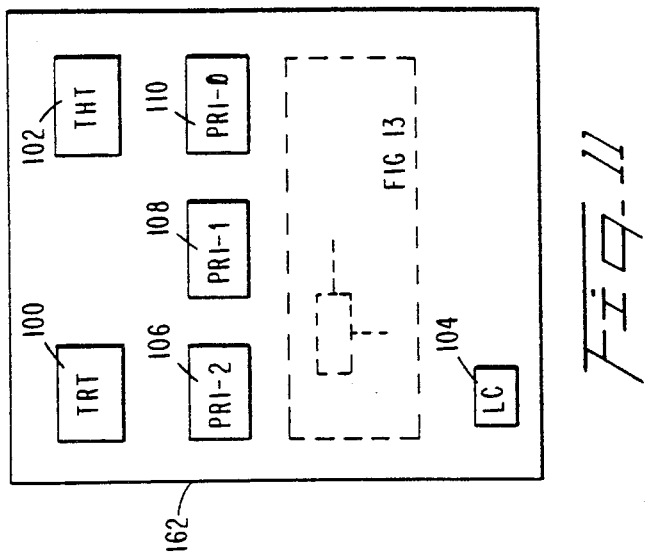
FIG. 11 is a more detailed diagram of the core medium access controller shown in FIG. 9, including token holding timer, token rotation timer and priority threshold registers contained therein.

The core MAC 162, within medium access controller 120 shown in FIG. 8, stores a number of registers, counters and timers for carrying out FDDI specifications implemented in accordance with the invention. In FIG. 11, FDDI timers include a token rotation timer (TRT) 100 storing a count value that is initialized with different values during different phases of token ring operation as defined in FDDI standards. The value of the TRT timer represents the latest negotiated token rotation time, and when expired will be subjected to a recovery, or claim, process.

THT timer 102 contains the value of the current token holding time, and counts down during asynchronous transmission. The THT value in register 102 is initialized with the TRT value when the token is captured and the late count (LC) in counter 104 is 0. Other registers shown (FIG. 13) that are accessible by the user through the node processor bus, include an information register for storing bytes of an MAC frame, and a TMAX register to load value into the TRT timer in response to events designated by FDDI specifications. Also included in the core medium access controller 162 are a TVX register for storing the TVX 112 value. defined in FDDI specifications as the expected time between valid transmissions. The content of the TVX register represents the initial count of the TVX timer. If the timer expires between frames, the node will attempt to recover the ring.

The core medium access controller 162 furthermore contains a number of registers 106, 108 and 110 that set the priority levels for the corresponding asynchronous transmit queues. The priority registers 106-110 can be written to and read from by the node processor at times other than during the token holding time, to program the respective THT priority values. Asynchronous data having various assigned priorities are sent to the medium based on the contents of the THT register 102 and the priority registers 106-110, in accordance with the transmission algorithm shown in FIG. 12.

In general, upon capture of the token, the medium access controller 120 locates queued frames ready to be transmitted to the medium, and services them in a fixed order of decreasing priorities, i.e., in the order async 0, async 1 and async 2 when the unexpired THT value is less than the priority threshold value programmed in the corresponding register. After transmission of each frame the priority registers are read to prioritize the transmission sequence. Once the transmission is complete, the token will be released.

OPERATION

The algorithm for prioritization of asynchronous queues is as follows. Frames from the queue with the highest priority pending, when the medium is requested, are sent out first. Frames from that queue are sent to the medium until the unexpired THT becomes less than the threshold value for that queue, or until frames from that queue are exhausted. The algorithm can be described as follows in C programming language.

```
If token captured then
X=A0;
While (Async. Xmit. Conditions)
   {
     if( MEDREQ[X] && THT>PRI[X] )
        {
          Send Frame[X];
          if(X != A0)  X=A0;
        }
     Else
        {
          if(X = = A0)       X=A1;
          Else  If(X = = A1)  X=A2;
                Else          X=A0;
        }
   }
```

Figure 12:
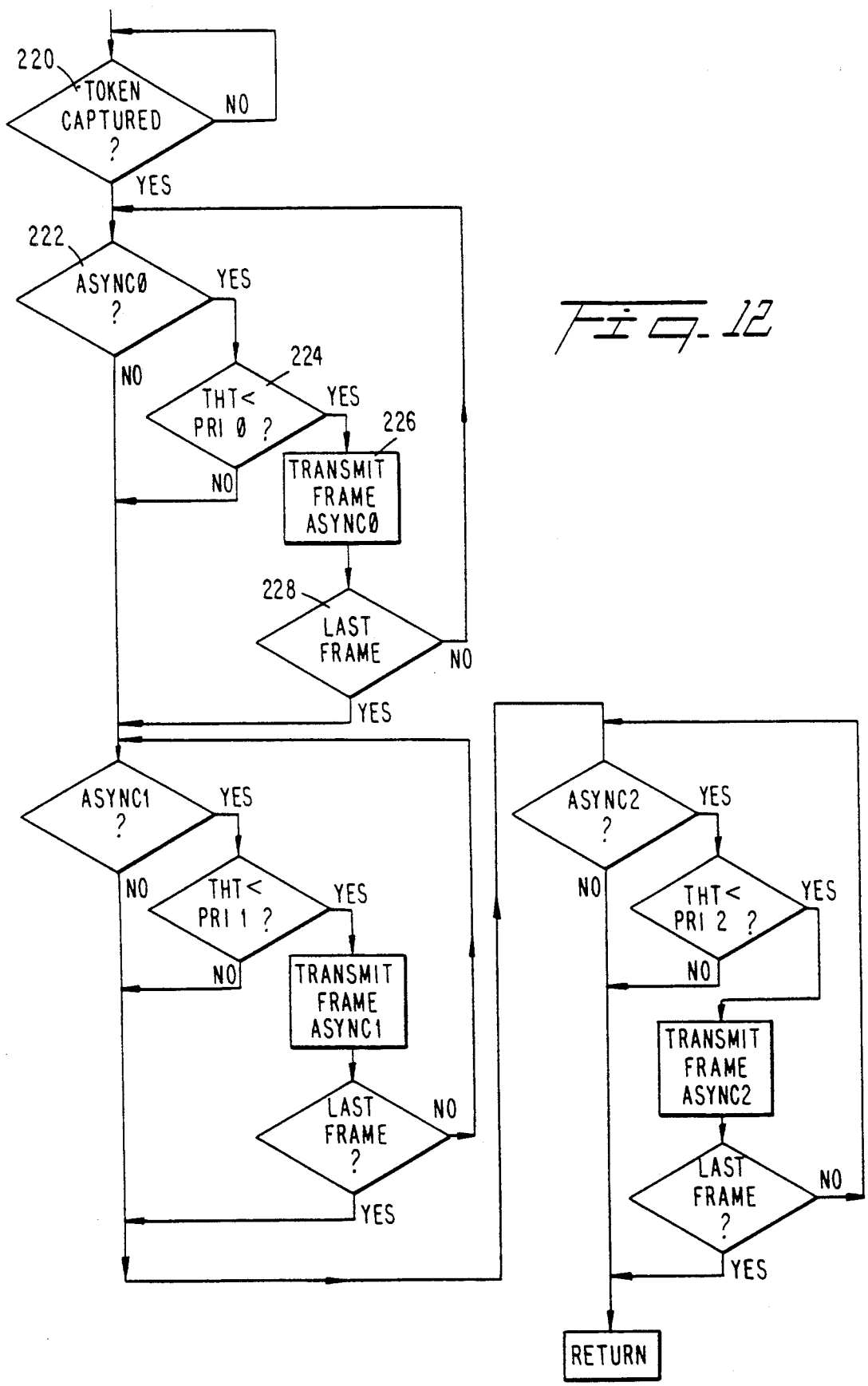
FIG. 12 is a flow chart showing transmission of asynchronous queues in proper sequence.

The algorithm may be implemented in the manner shown in FIG. 12. Upon token capture, in step 220, the frames of data waiting to be transmitted are checked to determine whether any frames of priority assignment async 0 are pending (step 222). If a frame of data of priority assignment async 0 is pending, the contents of the THT timer and PRI0 register are read, in step 224.

If the unexpired THT is higher than the value of PRI0, a pending frame of async 0 data is sent to the medium (step 226). This is repeated until the last frame of priority async 0 is transmitted (step 228). If either no async 0 frame was determined to be pending in step 222, or the last frame of async 0 has been transmitted, steps 222-228 are repeated for frames having priority assignment async 1 and threshold level PRI1, and thereafter the steps are carried out with respect to async 2 and PRI2 (not shown in FIG. 12).

In accordance with the present invention, the threshold values PRI(N) are programmed sequentially in increasing or decreasing order of priority. In the first method, these thresholds are programmed in a decreasing order of priority, i.e., PRI0<PRI2 as a function of unexpired THT, so that all higher priority data is transmitted before any lower priority data is transmitted during a token capture. If the thresholds are programmed in an increasing order as described in the second method, however, i.e., with PRI0>PRI2, then higher priority data is transmitted first to the medium until the unexpired THT falls below the threshold value for that priority, then the next lower priority level data is transmitted, and so on, as shown in the transmission sequences of FIGS. 6(a) and 6(b).

IMPLEMENTATION

Figure 13:
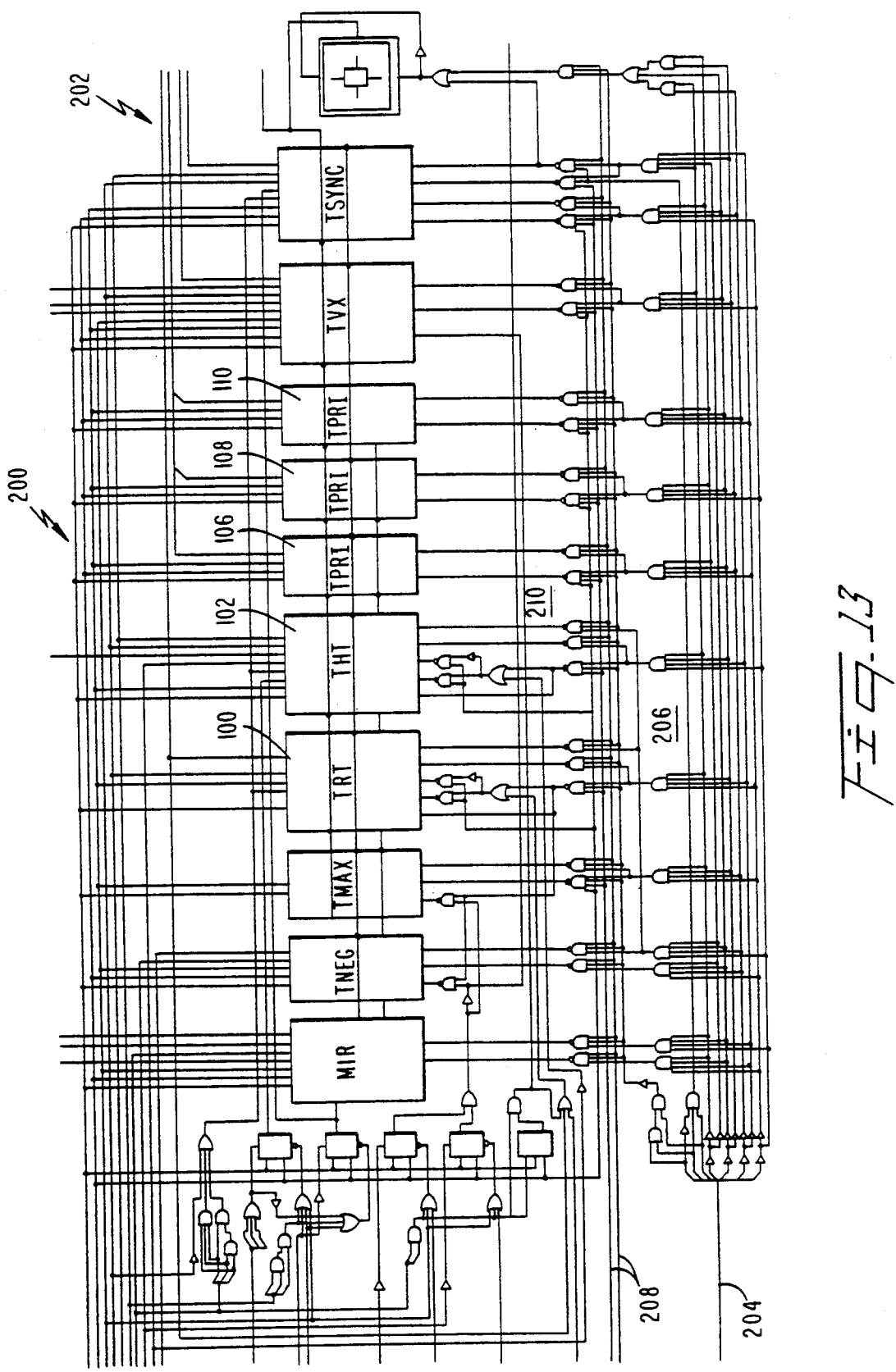
Figure 14:
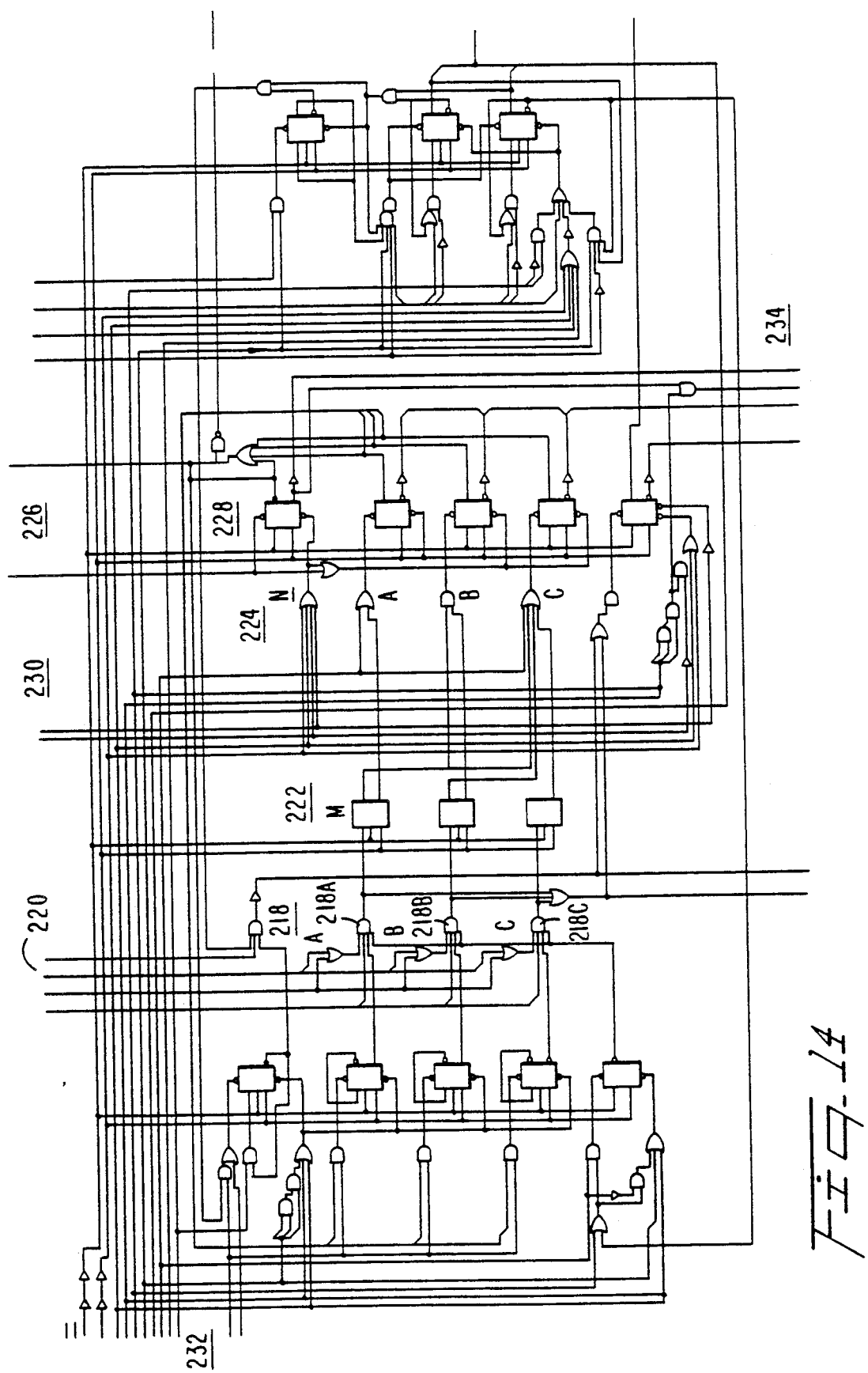

Referring to FIGS. 13-15, hardware for implementing asynchronous data transmission in accordance with the FDDI transmission algorithm, with the order of THT thresholds programmed arbitrarily in accordance with this invention, is described. In FIG. 13, TRT and THT timers 100 and 102 are on a common control bus 200 that carries clock, reset and other control signals. Also on the control bus 200 are the three THT threshold priority registers 106, 108 and 110. The timers and registers share a common output bus 202, for storage and comparison to develop frame transmit control signals by the circuitry shown in FIG. 15.

The threshold values stored in PRI registers 106, 108 and 110 are supplied thereto by the node processor through an address bus 204 and decoded by address decoders 206. Read and write operations of the registers in turn are controlled by read/write signals applied to bus 208 and decoded by read/write decoder 210. As the threshold values are of PRI registers 106-108 are supplied by the node processor, it is apparent that programming the threshold values is arbitrary, that is, the threshold values can be established either to have an increasing or a decreasing order of priorities. This enables the interface to transmit frames having a sequences of priorities along the lines of FIGS. 5(a)-5(c) or along the lines of FIGS. 6(a)-6(b). In FIG. 15, PRI registers 212 store the value of the THT threshold value depending on the priority assignment currently being transmitted. The output of the PRI register 212 is applied to one input of a comparator 214; the other input to the comparator is provided by the content of the THT timer 102. The output of the comparator 214 will attain one value or the other, depending on the result of comparison. This depends on whether or not the unexpired THT is greater than the stored THT threshold value.

The output of comparator 214 is stored in a latch 216, to be applied to a control circuit 218, shown in FIG. 14. Circuit 218 comprises gates 218(a), 218(b), 218(c) that are controlled by the output of latch 216 and a control signal from the node processor indicating the highest priority pending for transmission. These signals, supplied to control gates 218 on bus 220, "enable" one of the three gates at a time, depending on the highest priority. Following transmission of each frame, the same or a different one of the three gates is enabled depending on the highest priority then pending for transmission to the medium.

The outputs of control gates 218 are stored in latches 222 and then applied to gates 224 that carry out ultimate priority selection in accordance with data to command transmission supplied by the node processor on bus 226.

The outputs of gates 224 are stored in registers 228, that are controlled by bus 226 to control frame transmission to the medium. The registers 228 can be reset, as an initial condition, by reset signals on bus 230. Another bus 232 selects the order of queues within which frames are transmitted to the medium; bus 234 acknowledges the queue from which the current frames will be transmitted.

SUMMARY

The system and method of this invention implement the FDDI priority algorithm described hereinabove such that by changing the THT threshold values either in an increasing or decreasing order, flow of each priority queue upon token capture can be controlled in either of two different ways. If the thresholds are programmed in a decreasing order as a function of unexpired THT, i.e., PRI0<PRO1<PRI2, then higher priority data is transmitted before lower priority data. Under this condition, lower priority data will not be transmitted until all higher priority data has been transmitted during token capture. If the thresholds are programmed in an increasing order i.e., PRI0>PRI1->PRI2, higher priority data will be transmitted first, until the unexpired THT falls below the threshold value for that priority, and then the next low priority data is transmitted, and so on, so that at least some data of each priority assignment is transmitted during each token capture.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. For network having a plurality of processors, each including a memory means for storing frames of data arranged in queues having different transmit priorities, and a medium forming a digital data communication path among said processors,
   a network controller for each of said processors, comprising:
   first means implementing a timed token ring communication protocol for accessing said medium when a token on the medium is held and for releasing the token following expiration of a predetermined token holding time THT; and
   a random access memory for storing queues of data frames to be transmitted on said medium, said queues of data frames being assigned different values of THT threshold, and means for setting the value of THT threshold for each priority arbitrarily;
   wherein said first means includes means responsive to receipt of the token for transmitting a queue of said framed data during the token holding time while an unexpired THT is above the THT threshold value for the queue being transmitted.

2. The controller of claim 1, wherein said values of THT thresholds are set in a decreasing order of priority as a function of unexpired THT so that at least some frames of each priority pending are transmitted during every token capture.

3. The controller of claim 1, wherein said network comprises a Fiber Distributed Data Interface, or FDDI, network.

4. The controller of claim 1, including register means for storing said THT threshold values, means for controlling said register means by a corresponding one of said processors and comparator means for comparing the content of said register means with said unexpired THT.

5. The controller of claim 1, including second means for configuring at least one logical FIFO in said random access memory for storing said queues of data frames.

6. For a network having a plurality of processors, each including a system memory means for storing frames of data arranged in queues having different transmit priorities, and a medium forming a digital data communication path along said processors,
   a network controller for each of said processors, comprising:
   first means implementing a timed token ring communication protocol for accessing said medium when a token on the medium is held and for releasing the token following expiration of a predetemined token holding time THT; and
   second means for storing queues of asynchronous data frames to be transmitted on said medium, said queues of asynchronous data frames being assigned different THT threshold values and for setting said THT threshold value for each priority arbitrarily in order of transmit priority;
   wherein said first means includes means responsive to receipt of the token for transmitting a queue of said framed data during the token holding time while an unexpired THT is above the THT threshold value for the queue being transmitted.

7. The controller of claim 6, wherein said values of THT thresholds are set in a decreasing order of priority as a function of unexpired THT so that at least some frames of each selected priority pending are transmitted during every token capture.

8. The controller of claim 6, wherein said network comprises a Fiber Distributed Data Interface, or FDDI, network.

9. In a network having a plurality of processors, each including a system memory means for storing frames of data arranged in queues having different transmit priorities, and a medium forming a digital data communication path among said processors, first means implementing a timed token ring communication protocol for accessing said medium during a token capture, means for establishing a token holding time THT, means for storing queues of data frames having different transmit priorities and THT threshold values, and means responsive to receipt of the token for transmitting on said medium one of said queues while the THT threshold value of the queue having the highest priority is less than an unexpired THT:
   an improvement, comprising means for setting THT threshold value for each priority arbitrarily in a decreasing order of priority as a funciton of unexpired THT, so that at least some frames of every selected priority pending are transmitted during every token capture.

10. The improvement of claim 9, wherein said network comprises a Fiber Distributed Data Interface, or FDDI, network.

11. A method of controlling transmission to a medium of asynchronous frames of data in a network having a plurality of processors connected to the medium and accessing said medium using a timed token ring communication protocol, each processor having a system memroy for storing frames of data arranged in queues having different transmit priorities, the method comprising the steps of:

capturing a token on a medium;

accessing said medium when a token on the medium is held and releasing the token following expiration of a predetermined token holding time THT;

storing in a random access memory queues of data frames having assigned thereto different THT threshold values;

setting said THT threshold for eAch priority arbitrarily; and transmitting a queue of said data frames during the token holding time when an unexpired THT is above the THT threshold value for the queue being transmitted.

12. The controller of claim 11, wherein said values of THT thresholds are set in a decreasing order of priority as a function of unexpried THT so that at lest some frames of every selected priority pending are transmitted during every token capture.

13. The controller of claim 11, wherein said network comprises a Fiber Distributed Data Interface, or FDDI, network.

* * * * *